3,044,932
APPETITE SUPPRESSANT DRUGS
Adrian P. Tazelaar and William Veldkamp, Kalamazoo Township, Kalamazoo County, Mich., assignors to The Upjohn Company, Kalamazoo, Mich., a corporation of Delaware
No Drawing. Filed Feb. 24, 1960, Ser. No. 10,569
4 Claims. (Cl. 167—55)

This invention relates to a novel therapeutic composition and more particularly to an oral anorexigenic composition and a process for the control of body weight by the oral administration thereof.

Anorexigenic compositions are sometimes referred to as appetite satient compositions, anti-appetite compositions, anti-obesity, weight-control compositions and the like and are known in the art. However, the known anorexigenic compositions and processes possess undesirable side effects especially those resulting from central nervous system stimulation which often cause jitteriness, nervous tension, disturbances of sleep, and undesirable effects on blood pressure and cardiac rhythm.

The present invention provides an anorexigenic composition comprising a member selected from the group consisting of d-N-benzyl-$\beta$-phenylisopropylamine, d-N-methyl-N-benzyl-$\beta$-phenylisopropylamine and pharmacologically acceptable acid addition salts thereof dispersed in an oral pharmaceutical carrier and a process for the oral administration thereof. The inventive composition has unexpectedly been found to possess lessened undesirable side effects such as those occurring in the known anorexigenic compositions. d-N-benzyl-$\beta$-phenylisopropylamine, d-N-methyl-N-benzyl-$\beta$-phenylisopropylamine and acid addition salts thereof can be prepared according to the methods disclosed in U.S. Patent 2,789,138.

As used in the specification and claims of the present application, oral pharmaceutical carrier is intended to include solid oral carriers, such as those used in capsules, pills and tablets and liquid oral carriers, such as those used in elixirs, solutions, suspensions and syrups. Animal feed carriers and pre-mixes are preferably of the solid oral type.

It is especially advantageous to formulate the inventive composition in dosage unit form for ease of administration and uniformity of dosage. Dosage unit form as used in the specification and claims herein refers to physically discrete units suitable as unitary dosages for animal and human subjects, each unit containing a predetermined quantity of active material calculated to produce the desired therapeutic effect in association with the required pharmaceutical carrier. The specifications for the novel dosage unit forms of this invention are dictated by and directly dependent on (a) the unique characteristics of the active material and the particular therapeutic effect to be achieved and (b) the limitations inherent in the art of compounding such an active material for therapeutic use in animal and human subjects as disclosed in detail in this specification, these being features of the present invention. Examples of the dosage unit forms heretofore described are tablets, capsules, pills, powder packets, wafers, cachets, teaspoonfuls, and tablespoonfuls, and segregated multiples thereof, and other forms alluded to herein.

In accordance with the specific type of dosage unit form, the inventive composition is prepared by formulating the principal therapeutically active ingredient d-N-benzyl-$\beta$-phenylisopropylamine, d-N-methyl-N-benzyl-$\beta$-phenylisopropylamine or acid addition salts thereof and any suitable complementary therapeutically active ingredients with the required carriers.

The said carriers are those required in formulating the specific type of dosage unit form. For example, in the case of a solid dosage unit form, the said carriers comprise disintegrators, lubricants, diluents, binders, flavors and the like. In the case of a liquid dosage unit form, the said carriers comprise water, edible oils, alcohol, glycols, colors, flavors, sweetening agents, suspending agents, surfactants, preservatives and the like. The animal feed carriers comprise in balanced amounts the essential dietary constituents such as protein, fat, carbohydrate, minerals and the like. The pre-mixes for animal use contain the active ingredient in concentrated form for addition to the animal feed.

The said complementary active ingredients comprise therapeutically active and acceptable compounds which complement the therapeutic activity of the principal therapeutically active ingredient. Suitable complementary active ingredients per dosage unit form include, for example, transquilizing agents such as ectylurea 100 to 300 milligrams, reserpine 0.1 to 1 milligram, meprobamate 200 to 400 milligrams; vitamins such as vitamins A, D, C, and the B complex group of vitamins; sedatives such as phenobarbital 8 to 60 milligrams, methyprylon 50 to 100 milligrams; bulking agents such as methylcellulose 0.5 to 2 grams; and psychic energizers such as methyl-$\alpha$(2-piperidyl)phenylacetate 5 to 10 milligrams and $\alpha,\alpha$-diphenyl-2-piperidinemethanol 1 to 2.5 milligrams.

The compositions for oral administration to mammals suitably comprise from about 5 to about 200 milligrams, preferably from about 25 to about 75 milligrams, of the principal therapeutically active ingredient per dosage unit form. The liquid compositions suitably comprise per milliliter, from about 1 to about 30 milligrams, preferably from about 5 to about 15 milligrams, of the principal therapeutically active ingredient. The process of this invention involves the use of such dosage units from one to three times daily depending upon the age, weight and condition of the subjects to be treated. Expressed differently, the dosage per kilo of body weight of the subject treated would vary from about 0.1 to about 2 mgs., preferably from about 0.33 to about 1 mg., of the principal active ingredient.

The composition and process of the present invention are therapeutically valuable in unexpectedly possessing selective anorexigenic and body-weight control activity with lessened central nervous stimulating effects in animals and humans.

The following examples teach those skilled in the art how to practice the invention and illustrate the best mode contemplated by the inventors of carrying out the invention but are not to be construed as limiting.

EXAMPLE 1.—SOFT GELATIN CAPSULES 10,000 soft gelatin capsules, each containing 10 milligrams of d-N-methyl-N-benzyl-$\beta$-phenylisopropylamine, are prepared from the following types and amounts of ingredients:

d-N-methyl-N-benzyl-$\beta$-phenylisopropylamine
grams__ 100
Corn oil _____ q.s.

A uniform dispersion of the amine in the corn oil is prepared and encapsulated into soft gelatin capsules. The capsules provide satisfactory reduction of food intake with good body weight control, in dogs weighing 15 kilograms, by the oral administration of one capsule three times daily.

EXAMPLE 2.—HARD GELATIN CAPSULES 10,000 hard gelatin capsules, each containing 25 milligrams of the hydrochloride salt of d-N-methyl-N-benzyl-β-phenylisopropylamine, are prepared from the following types and amounts of ingredients:

| | Grams |
|---|---|
| Hydrochloride salt | 250 |
| Lactose | 750 |
| Starch | 250 |
| Talc | 250 |

A uniform mixture of the hydrochloride and the supplementary ingredients is prepared and filled into two-piece hard gelatin capsules.

The capsules are useful clinically in the management of overweight conditions being administered orally three times daily to moderately overweight humans.

1000 grams of ectylurea (100 milligrams per capsule are added to the above formulation providing a composition with complementary tranquilizing effects in the management of obesity.

EXAMPLE 3.—TABLETS 5000 compressed tablets, each containing 10 milligrams of the hydrochloride salt of d-N-methyl-N-benzyl-β-phenylisopropylamine, are prepared from the following ingredients:

| | Grams |
|---|---|
| Hydrochloride salt | 50 |
| Dicalcium phosphate | 2000 |
| Starch | 800 |

The finely powdered ingredients are mixed well and granulated with syrup-starch paste. The granulation is dried and compressed into tablets using starch and calcium stearate as lubricants.

In a group of ten human female subjects with an initial average body weight of 97 kilos, an average weight reduction of 2 kilos resulted from the oral administration to each subject of one tablet three times daily for three weeks.

EXAMPLE 4.—TABLETS 10,000 compressed tablets, each containing 50 milligrams of the hydrochloride salt of d-N-methyl-N-benzyl-β-phenylisopropylamine, are prepared from the following types and amounts of ingredients:

| | Grams |
|---|---|
| Hydrochloride salt | 500 |
| Dicalcium phosphate | 1750 |
| Starch | 900 |

The finely powdered ingredients are mixed well and granulated with syrup-starch paste. The granulation is dried and compressed into tablets using starch and calcium stearate as lubricants. The tablets are used with satisfactory results in the more severe conditions requiring anorexigenic treatment being administered orally three times daily to human patients.

By the usual techniques the above formulation is also prepared as compression coated tablets which are equally useful in the clinical treatment of the conditions indicated.

2000 grams of meprobamate are added in the above formulation to provide an equally useful anorexigenic composition with complementary tranquilizing action in humans.

EXAMPLE 5.—TABLETS 5000 tablets, each containing 100 milligrams of the acetate salt of d-N-methyl-N-benzyl-β-phenylisopropylamine, are prepared from the following types and amounts of ingredients:

| | Grams |
|---|---|
| Acetate salt | 500 |
| Lactose | 900 |
| Starch | 50 |

The finely powdered ingredients are mixed well and granulated with syrup-starch paste. The granulation is dried and compressed into tablets using starch and calcium stearate as lubricants. Thereafter the tablets are sugar coated by techniques known in the art.

The tablets are useful in the management of pronounced obesity, being administered orally twice daily to human subjects.

75 grams of phenobarbital (15 milligrams per tablet) are added to the above formulation to provide a tablet with complementary sedative effects in the treatment of obesity.

EXAMPLE 6

Following the procedure of Example 5, 750 grams of the acetate salt are substituted for the 500 grams to provide equally useful tablets, each containing 150 milligrams of said salt, the tablets being administered orally once daily.

EXAMPLE 7.—AQUEOUS PREPARATION 1000 milliliters of a liquid oral preparation is prepared from the following types and amounts of ingredients:

| | | |
|---|---|---|
| Tragacanth | grams | 2 |
| Saccharin sodium | do | 1.5 |
| Cyclamate sodium | do | 0.3 |
| Preservative | do | 2 |
| Glycerin | milliliters | 150 |
| Purified water, U.S.P., q.s. ad 1000 milliliters. | | |

50 grams of cocoa, q.s. flavor and 10 grams of the lactic acid addition salt of d-N-methyl-N-benzyl-β-phenylisopropylamine are added in order. The whole is mixed well and homogenized, each teaspoonful (5 mls.) containing fifty milligrams of the active ingredient.

At a dose of one teaspoonful administered orally twice daily, the preparation is useful in the treatment of moderate obesity in humans.

200 grams of methocel (1 gram per teaspoonful) are added to the above formulation to provide a composition with complementary bulking action in the management of obesity.

EXAMPLE 8—ELIXIR 1000 milliliters of elixir, containing in each teaspoonful (5 mls.) 25 milligrams of d-N-benzyl-β-phenylisopropylamine, is prepared from the following types and amounts of ingredients:

| | | |
|---|---|---|
| d-N-benzyl-β-phenylisopropylamine | grams | 5 |
| Ethanol | milliliters | 150 |
| Saccharin sodium | grams | 1.5 |
| Cyclamate sodium | do | 0.3 |
| Glycerin, U.S.P. | milliliters | 150 |
| Preservative | grams | 2 |
| Purified water, U.S.P., q.s. ad 1000 milliliters. | | |

The active ingredient and the preservative are dissolved in the ethanol; the saccharin and cylamate are dissolved in the water. These solutions are well mixed. The glycerin is added to the mixture and the whole is made up to volume with q.s. water.

A dose of one teaspoonful administered three times daily to humans provides satisfactory anorexigenic action in the treatment of moderately overweight conditions.

EXAMPLE 9

Food intake and weight control data were obtained in a group of eight dogs. A pelletized balanced dog chow was available to the dogs at all times. After a two-week control period, each dog was given orally the inventive composition in capsule form containing the d-N-methyl- N-benzyl-β-phenylisopropylamine hydrochloride salt. The dosage was 1 mg. per kg. of body weight twice daily for a period of four weeks. Food intake was determined daily and the dogs were weighed once each week. The data obtained from this experiment are summarized in Table I.

*Table I*

|  |  | Food intake per dog, per day, grams | Percent Reduction of food intake | Total weight (kg.) |
|---|---|---|---|---|
| 2 Weeks | Control period | 284 |  | 105.2 |
| 1st Week | Treatment period | 172 | 40 | 99.8 |
| 2nd Week | do | 199 | 30 | 100.4 |
| 3rd Week | do | 233 | 18 | 99.0 |
| 4th Week | do | 286 | 0 | 99.9 |
| Average Inhibition |  |  | 22 |  |

EXAMPLE 10

By the procedure of Example 9, except that the inventive composition was given in an amount equivalent to 0.5 mg. of the hydrochloride salt per kg., data on food intake and weight control were obtained. Table II contains the data.

*Table II*

|  |  | Food intake per dog, per day, grams | Percent Reduction of food intake | Total weight (kg.) |
|---|---|---|---|---|
| 2 Weeks | Control period | 332 |  | 104.8 |
| 1st Week | Treatment period | 286 | 14 | 102.9 |
| 2nd Week | do | 298 | 10 | 102.4 |
| 3rd Week | do | 284 | 15 | 101.3 |
| 4th Week | do | 321 | 3 | 104.5 |
| Average Inhibition |  |  | 10.5 |  |

EXAMPLE 11

By the procedure of Example 9 except that the incentive composition was given in an amount equivalent to 2 mg. of the hydrochloride salt per kg., data were obtained on food intake and weight control as tabulated in Table III.

*Table III*

|  |  | Food intake per dog, per day, grams | Percent Reduction of food intake | Total weight (kg.) |
|---|---|---|---|---|
| 2 Weeks | Control period | 330 |  | 107.3 |
| 1st Week | Treatment period | 121 | 63 | 98.3 |
| 2nd Week | do | 217 | 34 | 97.1 |
| 3rd Week | do | 275 | 17 | 99.5 |
| 4th Week | do | 270 | 18 | 97.0 |
| Average Inhibition |  |  | 33 |  |

EXAMPLE 12

An animal feed mix containing the active ingredient is prepared as follows:

Commercial dog feed _____ 50 kilos (fresh basis).
d-N-methyl-N-benzyl-β-phenyliso-
    propylamine hydrochloride ___ 2 grams.

The hydrochloride is worked into a portion of the feed by careful mixing and the mixture is incorporated uniformly into the balance of the feed. Each kilo of the final preparation contains 40 milligrams of the hydrochloride.

A 20 kilogram dog eating 1 kilo of the preparation per day receives a daily dose of 40 milligrams of the hydrochloride equal to 2 mg. per kilo of dog weight. This dose is effective in reducing the food intake.

What is claimed is:

1. The process for body weight control in mammals which comprises orally administering to overweight mammals a composition comprising a member selected from the group consisting of d-N-β-phenylisopropylamine, d-N-methyl-N-benzyl-β-phenylisopropylamine and acid addition salts thereof dispersed in an oral pharamaceutical carrier.

2. The process for body weight control in animal and human subjects which comprises orally administering to overweight animal and human subjects a composition comprising in dosage unit form from about 5 to about 200 milligrams of a member selected from the group consisting of d-N-benzyl-β-phenylisopropylamine, d-N-methyl-N-benzyl-β-phenylisopropylamine and acid addition salts thereof dispersed in an oral pharamaceutical carrier.

3. The process for body weight control in animal and human hubjects which comprises orally administering to overweight animal and human subjects per kilo of body weight of said subjects from about 0.1 to about 2 milligrams of a member selected from the group consisting of d-N-benzyl-β-phenylisopropylamine, d-N-methyl-N-benzyl-β-phenylisopropylamine and acid addition salts thereof dispersed in an oral pharamaceutical carrier.

4. The process for body weight control in human subjects which comprises the oral administration to overweight human subjects of a member selected from the group consisting of d-N-benzyl-β-phenylisopropylamine, d-N-methyl-N-benzyl-β-phenylisopropylamine, and acid addition salts thereof.

References Cited in the file of this patent

UNITED STATES PATENTS 2,789,138    Heinzelman et al. _____ Apr. 16, 1957

OTHER REFERENCES

Marsh et al.: J. of Pharm. and Exptl. Therap., September 1950, pp. 300 and 304.

Fellows et al.: J. of Pharm. and Exptl. Therap., September 1950, p. 74.